Oct. 5, 1954 W. W. KENNEDY Re. 23,884

ADJUSTABLE GRILLE

Original Filed Sept. 21, 1950

INVENTOR.
Walter W. Kennedy
BY
Carlson, Pitzner, Hubbard & Wolfe
ATTORNEYS

Reissued Oct. 5, 1954

Re. 23,884

UNITED STATES PATENT OFFICE 23,884

ADJUSTABLE GRILLE

Walter W. Kennedy, Rockford, Ill., assignor to Barber-Colman Company, Rockford, Ill., a corporation of Illinois Original No. 2,630,053, dated March 3, 1953, Serial No. 185,954, September 21, 1950. Application for reissue January 8, 1954, Serial No. 403,086

5 Claims. (Cl. 98—40)

Matter enclosed in heavy brackets [ ] appears in the original patent but forms no part of this reissue specification; matter printed in italics indicates the additions made by reissue.

This invention relates to grilles for controlling the direction and pattern of discharge of air into a room or space, and has more particular reference to grilles having crossed sets of vanes both of which are adjustable selectively to vary the angle of discharge of the air in perpendicular planes.

One object is to provide a double adjustable grille in which the edges of the vanes of the two sets present a uniform frontal appearance in all positions of adjustment of the vanes of each set.

A more detailed object is to achieve pivotal adjustment of the vanes of one set by mounting thereof in notches formed in the trailing edge portions of one set and to provide for adjustment of the vanes of the latter set by a novel location of the pivots of the first set in relation to said notches.

The invention also resides in the novel construction and mounting of the different sets of vanes which permit the same to be stamped readily from sheet metal of uniform thickness.

Other objects and advantages of the invention will become apparent from the following detailed description taken in connection with the accompanying drawings, in which Figure 1 is a fragmentary perspective view embodying the novel features of the present invention.

Figure 1:
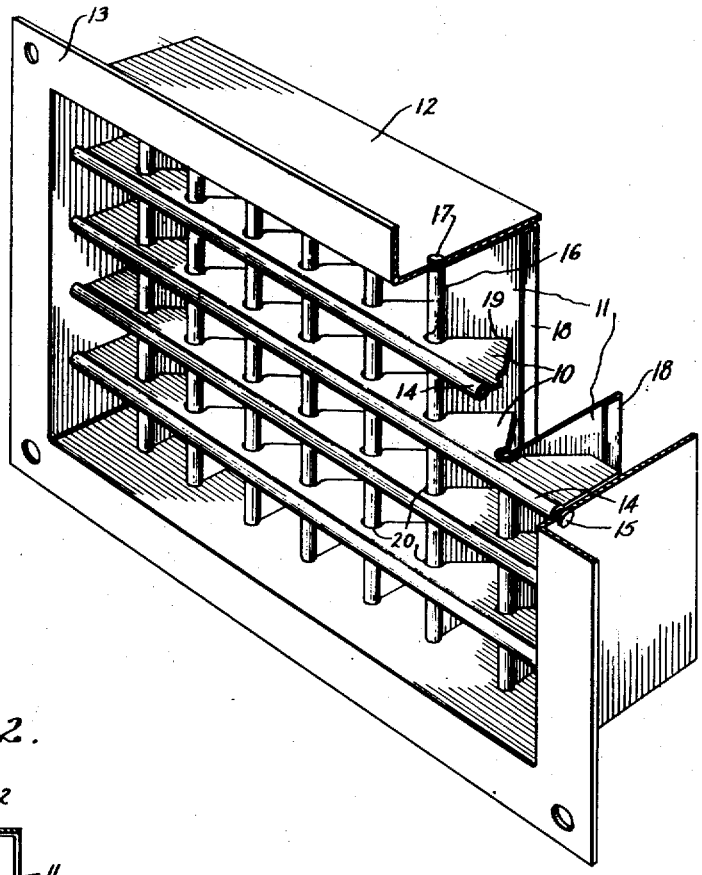

The grille shown in the drawings for purposes of illustration comprises two sets of crossed horizontal and vertically disposed vanes 10 and 11 pivotally supported in a frame 12 to swing individually in vertical and horizontal planes respectively. Herein, the frame comprises a sheet metal tube of rectangular shape having a right angular peripheral flange 13 adapted to be secured against the face of the wall or other part in which the grille is mounted.

The horizontal vanes 10 are formed from flat strips of thin sheet metal formed along its leading edge with a hollow curl 14 of generally circular cross section and acting to stiffen the vane as a whole. Headed pins 15 extending through and journaled in holes in the ends of the frame 12 project into and fit snugly in opposite ends of the curl and pivotally support the latter to swing about uniformly spaced and parallel horizontal axes. The pins fit in the holes closely enough to provide the friction necessary to retain the various positions of adjustment of the vanes.

The vertically disposed vanes 11 are similarly connstructed from sheet metal of the same thickness and each has a curl 16 receiving the ends of headed pins 17 projecting snugly through the sides of the frame 12. The trailing edge portions of the vanes are doubled upon themselves as indicated at 18 to effect a further reinforcement of these vanes. The vertical pivotal axes thus defined are disposed adjacent but spaced a short distance behind the curls 14 of the horizontal vanes 10. To permit this and swinging of these vanes about their vertical axes between the opposite limit positions shown in Fig. 3, notches 19 are punched out of the trailing edge portions of the horizontal vanes 10 with holes 20 formed in these vanes at the bottoms of the notches to receive the curls 16 while leaving some small clearance around the latter. The notches are generally V-shaped and their defining edges form substantially equilateral triangles each with its apex ance around the latter enables the other vanes located at the center of the hole 20. This clear- 10 to be swung upwardly or downwardly in any of the positions of adjustment of the vertical vanes 11. The latter adjustment is permitted even though the vertical vanes are generally flat and unslotted and thus present deflecting surfaces of relatively large area for the effective control of the direction of horizontal discharge of the air streams defined by the adjacent vanes.

Figure 2:
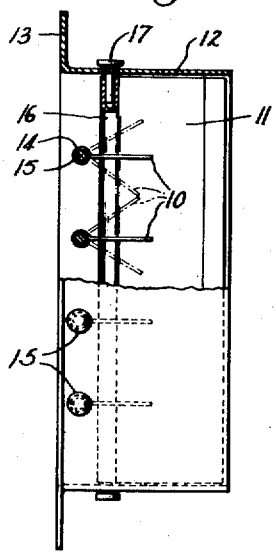
Fig. 2 is an end view with the frame partially broken away.
Figure 3:
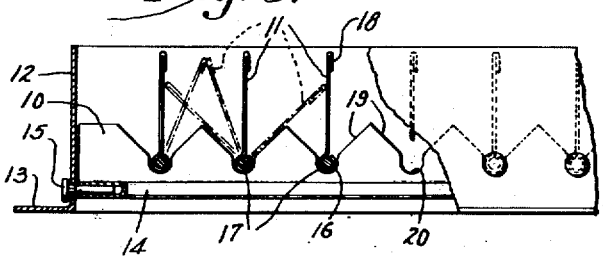
Fig. 3 is a top view with the frame partially broken away.

With the vanes constructed and mounted as described above, the vanes of each set may be adjusted individually over wide ranges between the limit positions shown in phantom in Figs. 2 and 3. When all of the vanes are disposed normal to the grille face and parallel to the axis of the frame, all of the individual air streams will be directed forwardly and perpendicular to the room wall. By swinging the vanes 10 downwardly and upwardly, the air streams will be deflected upwardly and downwardly respectively. Similarly, all or part of the air streams may be diverted to the right or left by swinging the vertical vanes 11 in the opposite direction about their axes defined by the pins 17.

It will be observed that the vanes of both sets are simple sheet metal stampings and are properly stiffened by the curls 14 and 16 and the fold 18. At the same time, the curls present a rounded frontal surface which contributes to a pleasing frontal appearance of the grille as a whole. The curls 16 are disposed so close behind the curls 14 as not to detract from the over-all appearance of the grille face.

I claim as my invention:

1. A grille comprising a generally rectangular frame, a plurality of laterally spaced vanes of thin sheet metal extending across said frame and each having a rounded curl formed at and reinforcing one edge, V-shaped notches cut from and spaced along the opposite edge of each vane and terminating at the apex in a generally circular hole disposed adjacent said curl, pivot pins supported in said frame and projecting into opposite ends of said curls, a second set of laterally spaced vanes each disposed in one of said notches in said first vanes and having a curl formed along one edge and extending through the alined holes of said first vanes, and pivot pins supported in the sides of said frame and projecting into the curls of said second vanes.

2. A grille comprising two sets of thin sheet metal vanes each formed with a curl along one edge, the vanes of one set having outwardly flaring notches spaced along the opposite edge with the apex of the notch disposed adjacent the curl of the vane, means pivotally supporting the notched vanes to swing about spaced parallel axes extending through the curls and with the corresponding notches of the different vanes alined with each other, and means pivotally supporting each of the vanes of the other set within one set of the alined notches of the notched vanes to swing about an axis extending through the curls of the vanes, said curls being disposed in the apexes of the notches.

3. A grille comprising a set of thin vanes each having outwardly flaring notches spaced along one edge thereof and terminating at an apex adjacent the other edge, means pivotally supporting said vanes to swing about spaced parallel axes extending along the uninterrupted edges of the vanes and with the corresponding notches of the adjacent vanes alined with each other, a second set of thin flat vanes each disposed in and extending through one set of the alined notches of the first vanes with one edge disposed in the apexes of said notches, and means pivotally supporting the vanes of the second set to swing about axes extending through the alined apexes of the notches in the first vanes whereby to mount the second vanes to swing back and forth in said notches in the different positions of adjustment of the first vanes about their axes.

4. A grille comprising a set of vanes each having outwardly flaring notches spaced along one edge thereof, means pivotally supporting said vanes to swing about spaced parallel axes extending along the uninterrupted edge portion of the vanes and with the corresponding notches of the adjacent vanes alined with each other, a second set of vanes each disposed in and extending through one set of the alined notches of the first vanes and having the forward edge disposed within said notches, and means pivotally supporting the vanes of the second set to swing about axes extending through said forward edges.

*5. A grille comprising a set of vanes each having outwardly flaring notches spaced along one edge thereof, means pivotally supporting said vanes to swing about spaced parallel axes extending longitudinally of the vanes along the other edges thereof with the corresponding notches of the adjacent vanes alined with each other, a second set of vanes each disposed in and extending through one set of the alined notches of said first vanes and having an edge portion disposed within each of said notches, and means pivotally supporting the vanes of said second set to swing about axes extending along said edge portions whereby to permit the vanes of either one of the sets to swing about their respective axes while the vanes of the other set are in different angular positions.*

References Cited in the file of this patent or the original patent

UNITED STATES PATENTS

| Number | Name | Date |
|---|---|---|
| 1,850,822 | Young | Mar. 22, 1932 |
| 2,034,231 | Fox | Mar. 17, 1936 |
| 2,224,312 | O'Day | Dec. 10, 1940 |
| 2,626,556 | Davies | Jan. 27, 1953 |
| 2,642,792 | Reichelderfer | June 23, 1953 |

FOREIGN PATENTS

| Number | Country | Date |
|---|---|---|
| 371,636 | Germany | Mar. 17, 1923 |